(12) United States Patent
Jasperse (10) Patent No.: US 12,535,357 B2
(45) Date of Patent: Jan. 27, 2026

(54) ABSORBANCE SPECTROSCOPY ANALYZER AND METHOD OF USE

(71) Applicant: Siemens Healthcare Diagnostics Inc., Tarrytown, NY (US)

(72) Inventor: Jeffrey R. Jasperse, Newton, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 195 days.

(21) Appl. No.: 18/007,057

(22) PCT Filed: Jul. 23, 2021

(86) PCT No.: PCT/US2021/042945
§ 371 (c)(1),
(2) Date: Jan. 27, 2023

(87) PCT Pub. No.: WO2022/031458
PCT Pub. Date: Feb. 10, 2022

(65) Prior Publication Data
US 2023/0296438 A1  Sep. 21, 2023

Related U.S. Application Data

(60) Provisional application No. 63/060,284, filed on Aug. 3, 2020.

(51) Int. Cl.
*G01J 3/02* (2006.01)
*G01J 3/10* (2006.01)
*G01J 3/42* (2006.01)

(52) U.S. Cl.
CPC .............. *G01J 3/42* (2013.01); *G01J 3/0291* (2013.01); *G01J 3/10* (2013.01)

(58) Field of Classification Search
CPC .... G01J 3/42; G01J 3/0291; G01J 3/10; G01J 3/427; G01J 3/0229; G01J 3/0237; G01J 3/12
(Continued)

(56) References Cited

U.S. PATENT DOCUMENTS 4,707,133 A * 11/1987 Roberts ................ G01N 21/39
250/573
11,156,501 B1 * 10/2021 Zhang ...................... G01J 3/10
(Continued)

FOREIGN PATENT DOCUMENTS

JP    H04127036 A    4/1992
JP    2015102545 A    6/2015
(Continued)

OTHER PUBLICATIONS

International Search Report and Written Opinion of International Application No. PCT/US2021/042945 dated Nov. 2, 2021.

*Primary Examiner* — Isiaka O Akanbi (57) ABSTRACT

Absorbance spectroscopy methods and systems are disclosed including a spectroscopy analyzer, comprising: an optical element device positioned to receive an analysis light that passes through a sample of a fluid specimen from an illumination unit, the analysis light including first light in a first light range and second light in a second light range different than the first light range, the optical element device comprising: a housing assembly that defines an internal space; and a dichroic mirror-reflector within the internal space positioned to receive the analysis light, the dichroic mirror-reflector configured to filter the analysis light such that a first portion of the analysis light in the first light range is reflected off the dichroic mirror-reflector as a spectrometer light, and such that a second portion of the analysis light in the second light range passes through the dichroic mirror-reflector as a detector light.

11 Claims, 6 Drawing Sheets

(58) Field of Classification Search
USPC .......................................................... 356/326
See application file for complete search history.

(56) References Cited

U.S. PATENT DOCUMENTS

| | | | | |
|---|---|---|---|---|
| 2004/0022164 A1* | 2/2004 | Nishioka | ............... | G11B 7/1353 |
| 2005/0124870 A1 | 6/2005 | Lipson | | |
| 2006/0197033 A1* | 9/2006 | Hairston | ................ | G01N 21/85 |
| | | | | 250/458.1 |
| 2007/0129614 A1* | 6/2007 | Schmitt | ............. | G01N 21/3554 |
| | | | | 600/473 |
| 2009/0059207 A1* | 3/2009 | Nerin | ................ | G01N 15/1434 |
| | | | | 356/73 |
| 2010/0020318 A1* | 1/2010 | Lee | ....................... | G01J 3/0237 |
| | | | | 356/318 |
| 2010/0108910 A1* | 5/2010 | Morrell | ............. | G01N 15/0205 |
| | | | | 356/336 |
| 2010/0238442 A1* | 9/2010 | Heng | ................ | G01N 15/1433 |
| | | | | 382/294 |
| 2011/0037978 A1* | 2/2011 | Schoenfelder | ............ | G01J 3/02 |
| | | | | 356/326 |
| 2011/0108719 A1 | 5/2011 | Ford et al. | | |
| 2011/0164248 A1* | 7/2011 | Bushaw | ............. | G01N 21/3151 |
| | | | | 356/318 |
| 2012/0280143 A1* | 11/2012 | Kim | ....................... | G01J 3/0229 |
| | | | | 250/208.2 |
| 2013/0308122 A1* | 11/2013 | Merchez | ................ | G01N 21/47 |
| | | | | 356/72 |
| 2015/0138533 A1* | 5/2015 | Bolles | ................... | G01J 3/0237 |
| | | | | 356/326 |
| 2017/0176338 A1* | 6/2017 | Wu | ..................... | G01N 21/6428 |
| 2020/0011787 A1 | 1/2020 | Dalby et al. | | |
| 2021/0072158 A1* | 3/2021 | Ilchenko | ................... | G01J 3/44 |
| 2021/0239603 A1* | 8/2021 | Jasperse | ................ | G02B 5/005 |
| 2022/0136960 A1* | 5/2022 | Jasperse | ................ | G02B 5/005 |
| | | | | 356/405 |

FOREIGN PATENT DOCUMENTS

WO 2019213484 A1 11/2019
WO 2021222084 A1 11/2021

* cited by examiner

ABSORBANCE SPECTROSCOPY ANALYZER AND METHOD OF USE

This application claims benefit under 35 USC § 119(e) of U.S. Provisional Application No. 63/060,284, filed Aug. 3, 2020. The entire contents of the above-referenced patent application(s) are hereby expressly incorporated herein by reference.

FIELD OF THE DISCLOSURE

The disclosure generally relates to absorbance spectroscopy analyzers and methods for specimen analyses. More particularly the disclosure relates to spectroscopy analyzers configured to utilize light wavelengths in different parts of the spectrum while maintaining a compact, economical, and easily manufacturable footprint, for example, by combining and dividing light wavelengths.

BACKGROUND

Sample specimens are measured in laboratory absorbance spectroscopy analyzers to calculate the concentrations of substances in the specimen, part of which may include utilizing the Beer-Lambert law which relates the attenuation of light to the properties of the material through which the light is travelling. In high volume product applications, the size and cost of the analyzer are critical factors.

Currently, substances and concentrations in a sample specimen are typically measured using analyzers having a spectrometer configured for use with a broadband light source. Typical sample analyzers use an optical system during the test procedure to obtain readings from the sample specimen. A typical optical system has an aligned light source and a spectrometer. A sample vessel contains the sample and, in some cases, a reagent, and is positioned between the light source and spectrometer along an optical axis centerline of the light source. The light source emits broadband light into the sample (or sample-reagent combination) inside the sample vessel. A chemical reaction of the sample-reagent combination may produce chromophores absorbing light at specific wavelengths proportional to the concentration of the analyte being measured. Light emitted from the illuminated sample or sample-reagent combination exits the sample vessel and is detected by the spectrometer.

Optical spectroscopy traditionally involves a white light source having highly stable light output wavelengths, a spectrometer having a transmission or diffraction grating, a linear photodiode array detector, and an enclosure to keep ambient light out. Traditional spectrometers are often complex and expensive because the spectrometer must provide sufficient resolution and stray light to make an accurate absorbance spectrum measurement on the specimen.

Spectrometers are designed such that a particular spectrometer works for a corresponding specific range of wavelengths where signal information is most useful regarding the substances to be determined in the sample specimen. In many applications such as blood Oximetry, the useful spectrum is approximately 400 nm to approximately 700 nm. Some substances in blood produce signals outside this range. For example, glucose, creatinine, and blood urea nitrogen have a useful spectrum in the near and mid infrared spectrum of approximately 1050 nm to approximately 2500 nm.

Therefore, in prior art systems, when multiple substances are to be determined that require widely divergent wavelengths, multiple, separate spectrometers were used. For example, past systems have used a first spectrometer for a first wavelength range and a second spectrometer for a second wavelength range. However, using multiple spectrometers increases size and cost, which is undesirable. A practical optical system for spectral analysis must be compact and easy to manufacture at a reasonably low cost.

Additionally, since it is desirable to create a small, uniform, light spot from the light source onto the specimen, traditionally, a specific, separate, light source was used to produce the range of wavelengths for each spectrometer. There has been a lack in the field of systems that use multiple light sources with each wavelength providing sufficient power intensity, but that still create the small, uniform light spot onto the specimen, while maintaining a compact, low-cost design.

What is needed is a spectroscopy analyzer that provides multiple wavelengths or wavelength ranges in order to test a variety of specimens with a single spectroscopy analyzer, utilizing a small, uniform, light spot, while maintaining a compact, low-cost design, by providing a technical solution to the technical problems described.

SUMMARY

Spectroscopy analyzers and methods of use are disclosed. The problem of complex, expensive, and large, spectrophotometers required for spectral analysis of multiple wavelengths or wavelength ranges in order to test a variety of specimens is addressed through a compact device for the integration of spectroscopy components.

The spectroscopy analyzers described herein integrate optical components in a unique design configuration, in a cost effective and compact complete system. In some implementations, the spectroscopy analyzers incorporate visible spectroscopy in the 450 nm to 680 nm range along with multiple other wavelengths, for example 1050 nm to 1500 nm range, 350 nm ultra-violet, and/or a range from approximately 200 nm to approximately 2500 nm, without adding the cost imposed by a wide-wavelength range spectrophotometer. The spectroscopy analyzers described herein provide both high resolution spectroscopy within a specific spectrum, and multiple wavelengths outside of a single range. For example, near infrared wavelengths in the range of 1050 nm to 2500 nm can be practically applied, in addition to ultraviolet in the range of 200 nm to 400 nm, with sufficient signal power transfer for adequate signal-to-noise transmission.

Further, the spectroscopy analyzers may create a uniform small light spot (for example, about 1 mm in diameter), to illuminate a specimen for absorbance spectroscopy while maintaining a small specimen volume. Additionally, the receive optics may collect the specimen signal output power efficiently even in extreme output light signal divergence conditions (that is, when the light signal is not perfectly collimated such that the light waves may not be parallel). Further, this system is compact and easy to manufacture at low cost.

In one aspect of the present disclosure, a spectroscopy analyzer may comprise an optical element device positioned to receive at least a portion of an analysis light that passes through a sample of a fluid specimen from an illumination unit, the analysis light including first light in a first light range of approximately 450 nm to approximately 680 nm and second light in a second light range different than the first light range. The optical element device may comprise a device housing assembly that defines a device internal space; and a dichroic mirror-reflector within the device internal space of the device housing assembly positioned to receive the analysis light. The dichroic mirror-reflector may be configured to filter the analysis light such that a first portion of the analysis light in the first light range is reflected off the dichroic mirror-reflector as a spectrometer light, and such that a second portion of the analysis light in the second light range passes through the dichroic mirror-reflector as a detector light.

In one aspect of the present disclosure, the spectroscopy analyzer may comprise a spectrometer positioned to receive the spectrometer light reflected from the dichroic mirror-reflector; and a detector positioned to receive the detector light through the dichroic mirror-reflector.

In one aspect of the present disclosure, the spectroscopy analyzer may comprise one or more computer processor configured to execute software code that causes the one or more computer processor to receive and analyze one or more signal from the detector to determine one or more properties of the detector light indicative of one or more first properties of the sample. The one or more properties of the sample may include a presence of water in the sample. In one aspect of the present disclosure, the spectroscopy analyzer may receive and analyze one or more signal from the spectrometer to determine one or more second properties of the sample based at least in part on the determined one or more first properties.

In one aspect of the present disclosure, a spectroscopy analyzer may comprise an illumination unit, which may comprise: a unit housing assembly that defines a unit internal space; a first light source within the unit internal space of the unit housing assembly, the first light source positioned on a first axis and configured to emit first light in a first light range of approximately 450 nm to approximately 680 nm; a second light source within the unit internal space of the unit housing assembly, positioned on a second axis that intersects and is angularly offset with respect to the first axis and configured to emit second light in at least a second light range of approximately 1050 nm to approximately 2500 nm; a third light source within the unit internal space of the unit housing assembly, the third light source positioned on the second axis, the third light source configured to emit third light in a third light range different than the second light range. The spectroscopy analyzer may comprise a reflector within the unit internal space of the unit housing assembly, the reflector including an aperture through which the first axis extends such that the first light passes through the aperture and a reflective surface angled in relation to the first axis and second axis such that the second light and the third light reflect off the reflector. The spectroscopy analyzer may comprise a focal lens within the unit internal space of the unit housing assembly positioned to receive and focus the first light passed through the aperture of the reflector, and to receive and focus the second light and the third light reflected from the reflective surface of the reflector; and an exit lens within the unit internal space of the unit housing assembly positioned to receive and focus the first light, the second light, and the third light from the focal lens into a specimen light.

In one aspect of the present disclosure, the spectroscopy analyzer may comprise a sample holder having a micro-channel configured to hold a sample of a fluid specimen and positioned such that the specimen light focused from the exit lens illuminates the sample, wherein the specimen light moving through the sample produces an analysis light.

In one aspect of the present disclosure, the spectroscopy analyzer may comprise an optical element device positioned to receive at least a portion of the analysis light that passes through the sample. The optical element device may comprise a device housing assembly that defines a device internal space; a receiving lens within the device internal space of the device housing assembly positioned to receive and focus the analysis light; a dichroic mirror-reflector within the device internal space of the device housing assembly positioned to receive the focused analysis light from the receiving lens, the dichroic mirror-reflector configured to filter the analysis light such that a first portion of the analysis light in the first light range and the third light range is reflected off the dichroic mirror-reflector as a spectrometer light, and such that a second portion of the analysis light in the second light range passes through the dichroic mirror-reflector as a detector light; and an output lens within the device internal space of the device housing assembly positioned to receive and focus the spectrometer light.

In one aspect of the present disclosure, the spectroscopy analyzer may comprise a spectrometer positioned to receive the focused spectrometer light from the output lens; and a detector positioned to receive the detector light through the dichroic mirror-reflector. In one aspect of the present disclosure, the spectroscopy analyzer may comprise one or more computer processor configured to execute software code that causes the one or more computer processor to receive and analyze one or more signal from the detector to determine one or more properties of the detector light indicative of one or more first properties of the sample. The one or more properties of the sample may include a presence of water in the sample. In one aspect of the present disclosure, the spectroscopy analyzer may receive and analyze one or more signal from the spectrometer to determine one or more second properties of the sample based at least in part on the determined one or more first properties.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic form, in the interest of clarity and conciseness. Not every component may be labeled in every drawing. Like reference numerals in the figures may represent and refer to the same or similar element or function. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The present disclosure describes spectroscopy analyzers and methods for using spectroscopy analyzers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, computational error, rounding error, and/or combinations thereof, for example, and that the subsequently described parameter, event, or circumstance completely occurs or that the subsequently described parameter, event, or circumstance occurs to a great extent or degree. For example, the terms "substantially," "about," and/or "approximately," means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one, including but not limited to each of, 2, 3, 4, 5, 10, 15, 20, 30, 40, 50, 100, and all integers therebetween. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise. In addition, the use of the phrase "at least one of X, V, and Z" will be understood to include X alone, V alone, and Z alone, as well as any combination of X, V, and Z.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment, although the inventive concepts disclosed herein are intended to encompass all combinations and permutations including one or more features of the embodiments described.

In accordance with the present disclosure, spectroscopy analyzers and methods of use are disclosed. As discussed above, prior art systems used limited light wavelength ranges or required multiple dedicated spectrometers. The present disclosure addresses these deficiencies with spectroscopy analyzers capable of analyzing multiple light wavelength ranges while having compact footprints.

Figure 1:
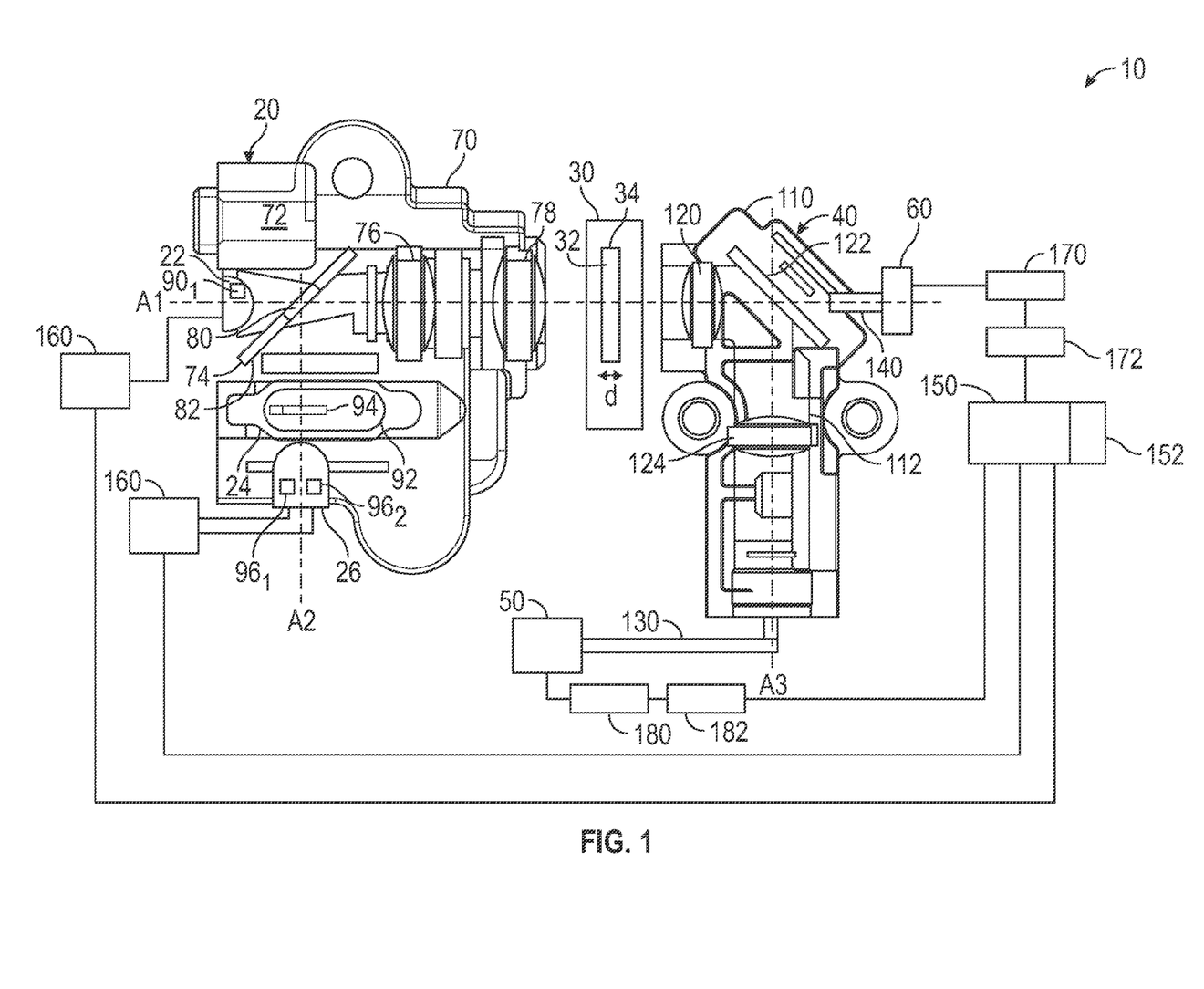
FIG. 1 is a diagram of an exemplary spectroscopy analyzer in accordance with the present disclosure.

Referring now to the drawings, and in particular to FIG. 1, shown therein is an exemplary spectroscopy analyzer 10. In general, the exemplary spectroscopy analyzer 10 may comprise an optical element device 40 configured to receive an analysis light passed through a sample 32 of a specimen and separate the analysis light into a spectrometer light directed to a spectrometer 50 and a detector light directed to a detector 60. The exemplary spectroscopy analyzer 10 may further comprise an illumination unit 20 having a first light source 22 and a second light source 26; a sample holder 30 configured to hold a sample 32 of a specimen positioned to be illuminated by specimen light from the illumination unit 20, to produce the analysis light. Optionally, the spectroscopy analyzer 10 may comprise a third light source 24.

The illumination unit 20 may comprise a unit housing assembly 70 that defines a unit internal space 72. The illumination unit 20 may further comprise a reflector 74, a focal lens 76, and an exit lens 78. The first light source 22, the third light source 24, the second light source 26, the reflector 74, the focal lens 76, and/or the exit lens 78 may be positioned within the unit internal space 72 of the unit housing assembly 70.

More particularly, the first light source 22 may be positioned on a first axis A1 within the unit internal space 72 of the unit housing assembly 70. The first light source 22 may be configured to emit first light in a first light range. The first light range may be in the visible light spectrum. In some implementations, the first light range may be approximately 450 nm to approximately 680 nm. The first light source 22 may emit light covering a point of, a portion of, or all of the first light range. The first light source 22 may comprise one or more light emitting diode $90_1 \ldots 90_n$ (which may be referred to in the singular or the plural herein) configured to emit the first light. In some implementations, the one or more light emitting diodes 90 may be large, high-power, light emitting diodes 90 that provide a predetermined ratio of measurement signal-to-noise in the spectrometer 50

The second light source 26 may be positioned within the unit internal space 72 of the unit housing assembly 70 on a second axis A2 that intersects and is angularly offset with respect to the first axis A1. The first axis A1 and the second axis A2 intersect to define an angle. In some implementations, the angle may be in a range of approximately 45 degrees and approximately 135 degrees. In some implementations, the angle may be in a range of approximately 75 degrees and approximately 105 degrees. In some implementations, the angle may be approximately 90 degrees.

The second light source 26 may be configured to emit second light in a second light range and/or at a second wavelength. The second light range and/or the second wavelength may be different than the first light range. In some implementations, the second light range may be approximately 1050 nm to approximately 2500 nm. In some implementations, the second light may have a wavelength of approximately 1050 nm. The second light source 26 may emit light covering a point of, a portion of, or all of the second light range. In some implementations, the second light range may partially overlap the first light range and/or the third light range.

In some implementations, the second light source 26 may comprise one or more light emitting diodes $96_1 \ldots 96_n$ (which may be referred to in the singular or the plural herein). The one or more light emitting diodes 96 may be large, high-power, light emitting diodes 96 that provide a predetermined ratio of measurement signal to noise in the detector. The second light source 26 may comprise one or more monochromatic light emitting diodes, each monochromatic light emitting diode configured to emit light at a corresponding predetermined light wavelength. In some implementations, the second light source 26 may comprise one or more halogen light.

In some implementations, the second light source 26 may comprise two or more light emitting diodes $96_1, 96_2, \ldots 96_n$. In some implementations, the second light source 26 may be configured such that the second light range is non-contiguous. For example, the second light range may comprise second light having wavelengths of approximately 200 nm to approximately 400 nm and also approximately 1050 nm to approximately 2500 nm. The second light source 26 may have a first light emitting diode $96_1$ configured to emit light in a first portion of the second light range and a second light emitting diode $96_2$ configured to emit light in a second portion of the second light range.

In some implementations, the third light source 24 may be positioned between the second light source 26 and the reflector 74. At least a portion of the second light may pass through the third light source 24 to reach the reflector 74.

In some implementations, the third light source 24 may be positioned within the unit internal space 72 of the unit housing assembly 70 on the second axis A2 that intersects and is angularly offset with respect to the first axis A1. The third light source 24 may be configured to emit third light in a third light range, and/or a second light wavelength, different than the first light range. The third light range may partially overlap the first light range and/or the second light range. The third light range may be approximately 550 nm to approximately 650 nm. The third light source 24 may emit light covering a point of, a portion of, or all of the third light range. The third light source 24 may comprise one or more neon light 92. The one or more neon light may comprise one or more electrodes 94. The one or more neon light may comprise one or more pink electrodes. The third light range may be approximately 585.249 nm and may be used for spectrometer calibration.

Figure 2:
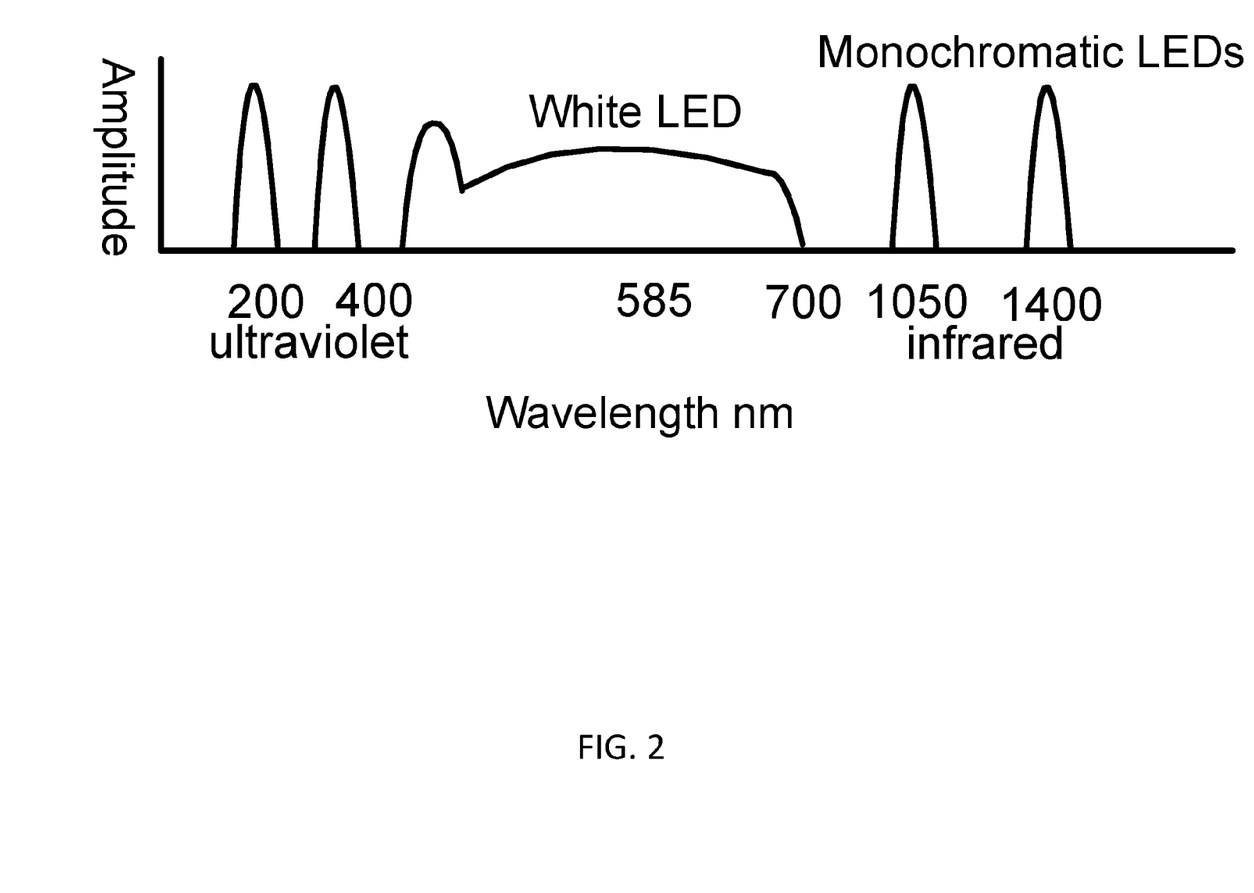
FIG. 2 is an exemplary spectral profile in accordance with the present disclosure.

FIG. 2 illustrates a spectral profile of some implementations of the first light and the second light and the third light, in which the first light source 22 is a white light emitting diode 90 configured to emit the first light in a visible light range of approximately 450 nm to approximately 680 nm, and the second light source 26 comprises a plurality of monochromatic light emitting diodes $96_1 \ldots 96_n$ configured to emit the second light in an infrared light range, for example, at approximately 1050 nm and at approximately 1400 nm, and the third light source 24 comprises a neon light configured to emit the third light at approximately 585 nm, as seen at the sample 32. Additionally, as shown in FIG. 2, in some implementations, the second light source 26 may comprise one or more light emitting diodes $96_1 \ldots 96_n$ configured to emit at least a portion of the second light in an ultraviolet light range of approximately 200 nm to approximately 400 nm (or at specific wavelengths, such as 200 nm and 350 nm, for example), as seen at the sample 32.

Figure 3:
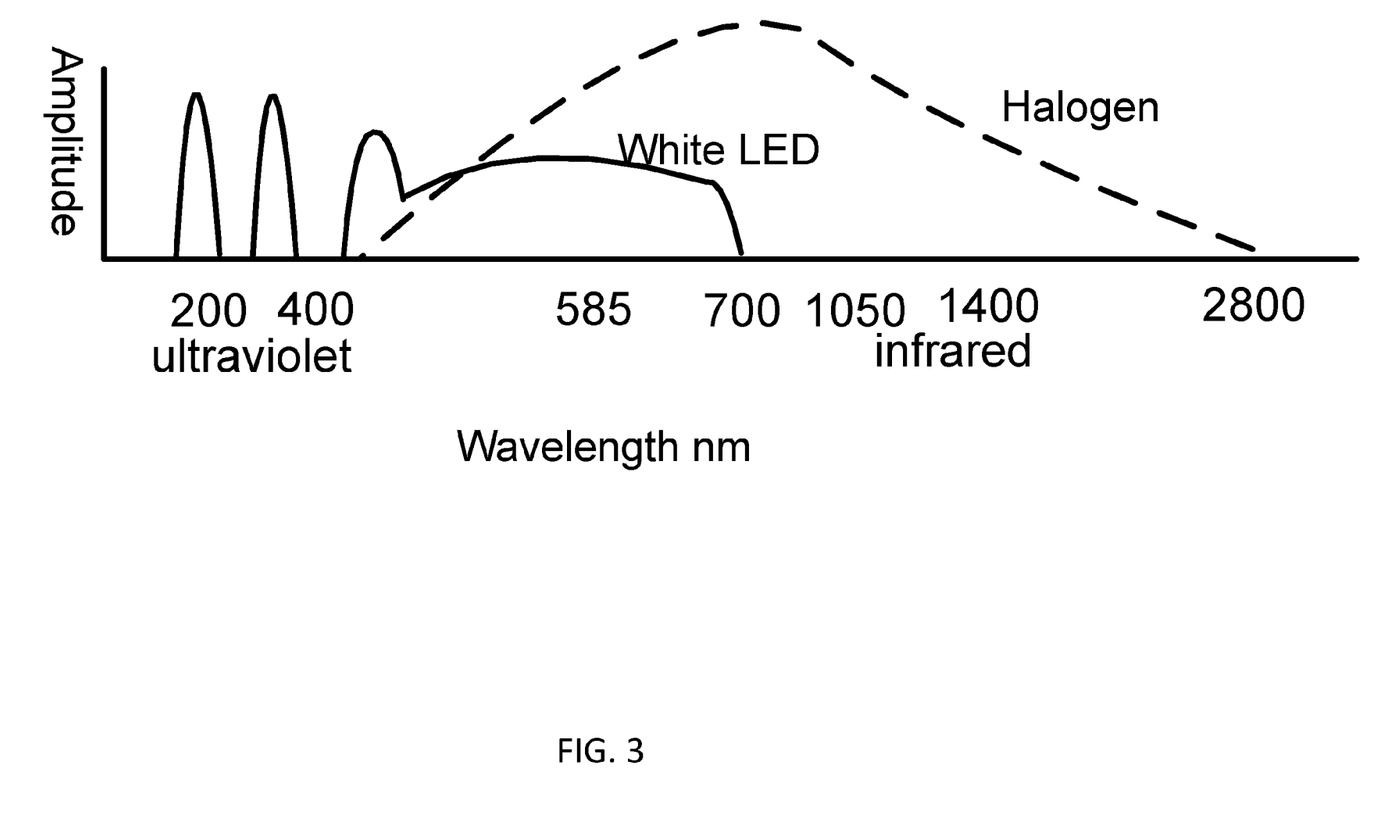
FIG. 3 is another exemplary spectral profile in accordance with the present disclosure.

FIG. 3 illustrates a spectral profile of some implementations of the first light and the second light and the third light, in which the first light source 22 is one or more white light emitting diode $90_1 \ldots 90_n$ configured to emit the first light in a visible light range of approximately 450 nm to approximately 680 nm, and the second light source 26 comprises one or more light (such as a halogen light) configured to emit the second light, including a visible light range and an infrared light range, in a range of approximately 450 nm to approximately 2800 nm, as seen at the sample 32. Additionally, as shown in FIG. 3, in some implementations, the second light source 26 may further comprise one or more light emitting diodes $96_1 \ldots 96_n$ configured to emit at least a portion of the second light in an ultraviolet light range of approximately 200 nm to approximately 400 nm (or at specific wavelengths, such as 200 nm and 350 nm, for example), as seen at the sample 32. Further, in this example, the third light source 24 comprises a neon light configured to emit the third light at approximately 585 nm.

Returning now to FIG. 1, in some implementations, the reflector 74 may have an aperture 80 through which the first axis A1 extends, such that the first light passes through the aperture 80. The reflector 74 may have a reflective surface 82 angled in relation to the first axis A1 and second axis A2, such that the second light and/or the third light reflect off the reflector 74. The aperture 80 of the reflector 74 may cause the first light to form a circular spot when it is directed through the aperture 80 in the reflector 74, while the reflective surface 82 around the aperture 80 may reflect the second light and/or the third light, thereby creating a doughnut shaped light spot around the circular spot of the first light.

In some implementations, if the first light range, the second light range, and the third light range do not overlap, then the reflector 74 may be a pass-band filter configured to pass through the first light along the first axis A1 and configured to reflect the second light and/or the third light from the reflective surface 82 angled in relation to the first axis A1 and the second axis A2.

The focal lens 76 may be positioned to receive and focus the first light after it is passed through the aperture 80 of the reflector 74 (or passed through the pass-band filter), and to receive and focus the second light and/or the third light reflected from the reflective surface 82 of the reflector 74.

The exit lens 78 may be positioned to receive and focus the first light, the second light, and/or the third light from the focal lens 76 to form the specimen light. The resulting specimen light may be focused onto the sample 32 of the specimen in the sample holder 30. The specimen light may be focused as a small-diameter, uniform, circular shape onto the sample 32. In some implementations, the specimen light may be focused to a circular shape having a diameter of approximately one millimeter.

The sample holder may be positioned on the first axis A1. The sample holder 30 may have a microchannel 34 configured to hold the sample 32 of the specimen and positioned such that the specimen light focused from the exit lens 78 illuminates the sample 32. The specimen may be a fluid specimen. At least a portion of the sample holder 30 configured to hold the sample 32 is transparent such that the specimen light reaches the sample 32 and/or interacts with the sample 32.

In some implementations, the microchannel 34 (and thus the pathlength of the specimen light through the sample 32) may have a depth (d) of approximately 100 microns to approximately 10 millimeters. The microchannel 34 may have a length of approximately two millimeters. In some implementations, the sample holder 30 may be constructed as described in the provisional patent application titled "Acoustophoretic Lysis Devices and Methods," Ser. No. 63/016,537, filed on Apr. 28, 2020, which is hereby incorporated by reference in its entirety.

The analysis light is the output of the specimen light moving through the sample. Interaction of the specimen light through the sample may change the specimen light to produce the analysis light. The differences in the analysis light from the specimen light are based on the constituents of, and/or properties of, the sample. The analysis light may be a diverging light (that is, the analysis light may not be perfectly collimated such that the light waves may not be parallel).

The optical element device 40 may be positioned to receive at least a portion of the analysis light output directed through the sample 32. The optical element device 40 may comprise a device housing assembly 110 that defines a device internal space 112. Though the illumination unit 20 and the optical element device 40 and are shown with the unit housing assembly 70 separate from the device housing assembly 110, one or more of the components of the spectroscopy analyzer 10 may share a single housing assembly taking the place of the unit housing assembly 70 and/or the device housing assembly 110, and/or an additional housing assembly may encompass one or more of the unit housing assembly 70 and the device housing assembly 110 and/or other components of the spectroscopy analyzer 10.

The optical element device 40 may further comprise a receiving lens 120, a dichroic mirror-reflector 122, and an output lens 124. The receiving lens 120, the dichroic mirror-reflector 122, and the output lens 124 may be positioned within the device internal space 112 of the device housing assembly 110.

The receiving lens 120 may be positioned to receive and focus the diverging analysis light. The receiving lens 120 may be positioned on the first axis A1. The receiving lens 120 may have a diameter of approximately six millimeters. The receiving lens 120 may compensate for manufacturing tolerance deviations by focusing the analysis light onto the dichroic mirror-reflector 122.

The dichroic mirror-reflector 122 may be positioned to receive the focused analysis light from the receiving lens 120. In some implementations, the dichroic mirror-reflector 122 may be positioned on the first axis A1. The dichroic mirror-reflector 122 may be configured to filter the analysis light such that a first portion of the analysis light that is in the first light range and/or the third light range is reflected off the dichroic mirror-reflector 122 as spectrometer light, and such that a second portion of the analysis light that is in the second light range passes through the dichroic mirror-reflector 122 as detector light. The dichroic mirror-reflector 122 may act as a passband filter and, as such, may allow predetermined ranges of light wavelengths to pass through the dichroic mirror-reflector 122, while reflecting other ranges of light wavelengths. For example, in some implementations, the dichroic mirror-reflector 122 may allow approximately 700 nm and longer wavelengths to pass to the detector 60, while approximately 450 nm to approximately 680 nm wavelength light is not allowed to pass through and is reflected to the output lens 124 and on to the spectrometer 50. In some implementations, the dichroic mirror-reflector 122 may allow light having wavelengths below approximately 400 nm to pass to the detector 60.

In some implementations, the dichroic mirror-reflector 122 may allow light having approximately 1050 nm wavelength, emitted from the second light source 26, to pass through the dichroic mirror-reflector 122 to the detector 60. Light having approximately 1050 nm wavelength is beneficial for providing a light signal through the sample holder 30 and/or the sample 32 to determine whether or not there is water in the sample holder 30 and/or the sample 32. That is, water has a spectral response of water to light having approximately 1050 nm wavelength, which can be analyzed and graphed as peaks in a spectral analysis.

The dichroic mirror-reflector 122 may be angled in relation to the first axis A1 and a third axis A3, such that the spectrometer light reflects off the dichroic mirror-reflector 122. The first axis A1 and the third axis A3 intersect to define an angle. In some implementations, the angle may be in a range of approximately 45 degrees and approximately 135 degrees. In some implementations, the angle may be in a range of approximately 75 degrees and approximately 105 degrees. In some implementations, the angle may be approximately 90 degrees.

The output lens 124 may be positioned to receive and focus the spectrometer light reflected from the dichroic mirror-reflector 122. The output lens 124 may be positioned on the third axis A3. The output lens 124 may compensate for manufacturing tolerance deviations by focusing the spectrometer light for use in the spectrometer 50.

The output lens 124 may focus the spectrometer light directly to the spectrometer 50 or to a first fiber optic cable 130 positioned between the output lens 124 and the spectrometer 50. The output lens 124 may focus the spectrometer light into a circular spot having a diameter greater than the diameter of the first fiber optic cable 130. The fiber optic cable may have a diameter of 600 microns. In some implementations, the aperture 80 in the reflector 74 of the illumination unit 20 may have a diameter configured to result in the spectrometer light having a diameter of 600 microns.

The spectrometer 50 may be positioned to receive the focused spectrometer light from the output lens 124. In some implementations, the spectrometer 50 may receive the spectrometer light through the first fiber optic cable 130.

The detector 60 may be positioned to receive the detector light passed through the dichroic mirror-reflector 122. The detector 60 may be configured to detect one or more wavelengths or ranges of wavelengths of light. In some implementations, the detector 60 may be configured to detect infrared light (such as light having wavelengths above approximately 1050 nm) and/or ultraviolet light (such as light having wavelengths below approximately 400 nm). In some implementations, the detector 60 may be a photodiode. The detector 60 may be a silicon photodiode. In some implementations, the detector 60 may be one or more second spectrometer configured to detect the second light.

In some implementations, the detector 60 may be positioned on the first axis A1. In some implementations, the detector 60 may receive the detector light through a second fiber optic cable 140 positioned between the dichroic mirror-reflector 122 and the detector 60, in which case the detector 60 may or may not be positioned on the first axis A1.

In some implementations, the spectroscopy analyzer 10 may further comprise (or be connected to) one or more computer processor 150. The one or more computer processor 150 may be configured to execute software code. The spectroscopy analyzer 10 may further comprise one or more non-transitory computer memory 152. The software code may be stored on the one or more non-transitory computer memory 152.

The software code, when executed on the one or more computer processors 150, may cause the one or more computer processors 150 to control one or more other components of the spectroscopy analyzer 10. For example, the software code, when executed on the one or more computer processors 150, may cause the one or more computer processors 150 to control one or more of the first light source 22, the second light source 26, and the third light source 24.

Optionally, in some implementations, the spectroscopy analyzer 10 may further comprise one or more drivers 160 configured to drive the first light source 22, the third light source 24, and/or the second light source 26. The software code, when executed on the one or more computer processors 150, may cause the one or more computer processors 150 to control the one or more drivers 160.

In some implementations, the spectroscopy analyzer 10 may further comprise one or more first amplifier 170 connected to the detector 60 and configured to receive, amplify, and output one or more signal from the detector 60 indicative of the detector light. In some implementations, the spectroscopy analyzer 10 may further comprise one or more first analog-to-digital converter 172 configured to receive the amplified detector light from the first amplifier 170, convert the detector light to a digital signal, and output the digital signal. The one or more computer processors 150 may be configured to execute software that causes the one or more computer processors 150 to receive and analyze the digital signal from the one or more first analog-to-digital converter 172 to determine one or more properties of the detector light indicative of one or more properties of the sample 32. The one or more properties of the sample 32 determined based on the detector light may include the presence and/or amount of water in the sample 32.

In some implementations, the spectroscopy analyzer 10 may further comprise one or more second amplifier 180 connected to the spectrometer 50 and configured to receive, amplify, and output one or more signal from the spectrometer 50 indicative of the spectrometer light. In some implementations, the spectroscopy analyzer 10 may further comprise one or more second analog-to-digital converter 182 configured to receive the amplified spectrometer light from the second amplifier 180, convert the amplified spectrometer light from the second amplifier 180 to a digital signal, and output the digital signal. The one or more computer processors 150 may be configured to execute software code that causes the one or more computer processor 150 to receive and analyze the digital signal from the one or more second analog-to-digital converter 182 to determine one or more properties of the spectrometer light indicative of one or more properties of the sample 32. The one or more properties of the sample 32 determined based on the spectrometer light may include the presence and type of one or more analytes in the sample 32. The one or more properties of the sample 32 determined based on the spectrometer light may include blood gas co-oximetry (also known as oximetry) information.

In some implementations, the one or more computer processor 150 may analyze one or more signal from the spectrometer 50 to determine one or more properties of the sample 32 based at least in part on one or more properties of the sample 32 previously determined based on the detector light. In some implementations, the one or more computer processor 150 may calibrate the spectrometer 50 based at least in part on one or more properties of the sample 32 previously determined based on the detector light.

Figure 4:
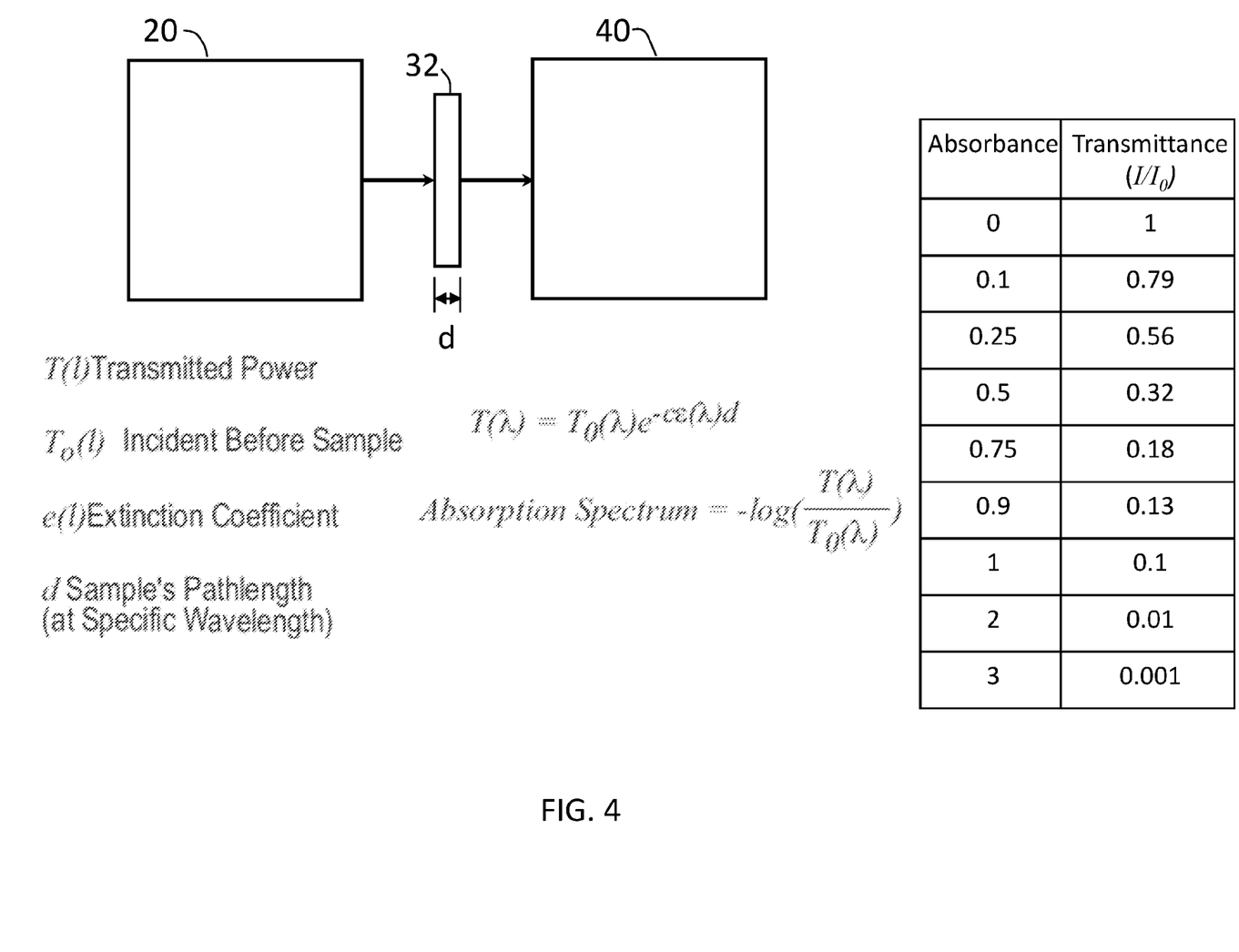
FIG. 4 is a diagram and table describing exemplary absorbance algorithms in conjunction with use of the spectroscopy analyzer in accordance with the present disclosure.

The one or more properties of the sample 32 may be determined based at least in part on the application of the Beer-Lambert Law, as detailed in FIG. 4, and described below, where:

$$T(\lambda) = T_0(\lambda) e^{-c \in (\lambda) d}$$

$$\text{Absorption Spectrum} = -\log\left(\frac{T(\lambda)}{T_0(\lambda)}\right)$$

Where $T(I)$ is transmitted power, $T_0(I)$ is incident before sample, $e(I)$ is an extinction coefficient, and d is the pathlength through the sample at a specific wavelength (for example, the depth of the microchannel).

And Where:

| Absorbance | Transmittance ($I/I_0$) |
|---|---|
| 0 | 1 |
| 0.1 | 0.79 |
| 0.25 | 0.56 |
| 0.5 | 0.32 |
| 0.75 | 0.18 |
| 0.9 | 0.13 |
| 1 | 0.1 |
| 2 | 0.01 |
| 3 | 0.001 |

Figure 5:
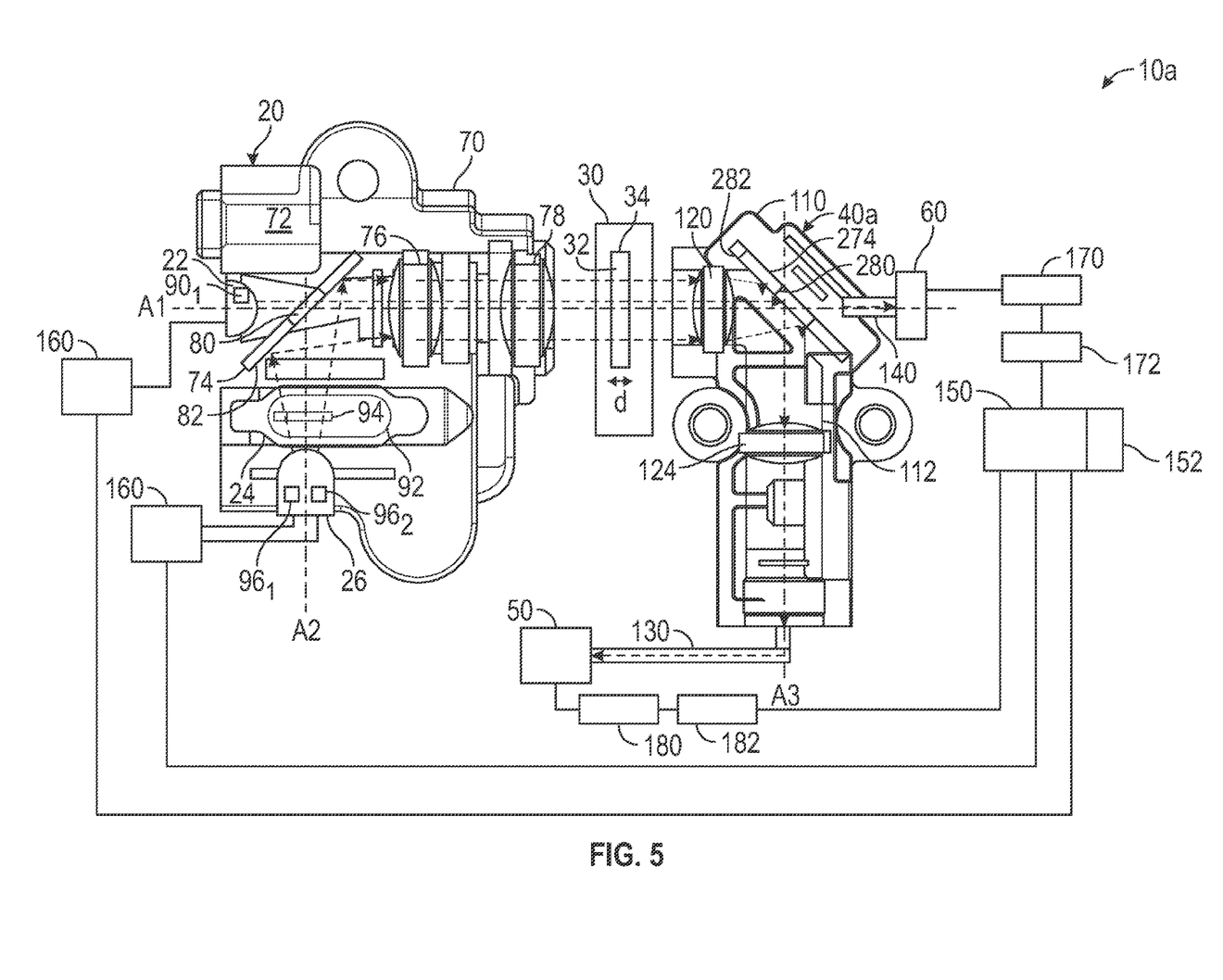
FIG. 5 is a diagram of another exemplary spectroscopy analyzer in accordance with the present disclosure.

As shown in FIG. 5, additionally or alternatively, in some implementations, a spectroscopy analyzer 10a, substantially similar to the spectroscopy analyzer 10 except as described, may further comprise, or the dichroic mirror-reflector 122 may be replaced by, a second reflector 274 having an aperture 280 and a reflective surface 282 and positioned within the device internal space 112 of the device housing assembly 110 of an optical element device 40a. The second reflector 274 may be positioned at an angle which lets the third light (for example, yellow and infrared light) through to the detector 60 through the aperture 280 and reflects the remainder of the light (i.e., the light not passing through the aperture) off the reflective surface 282 to the spectrometer 50 via the output lens 124.

Figure 6:
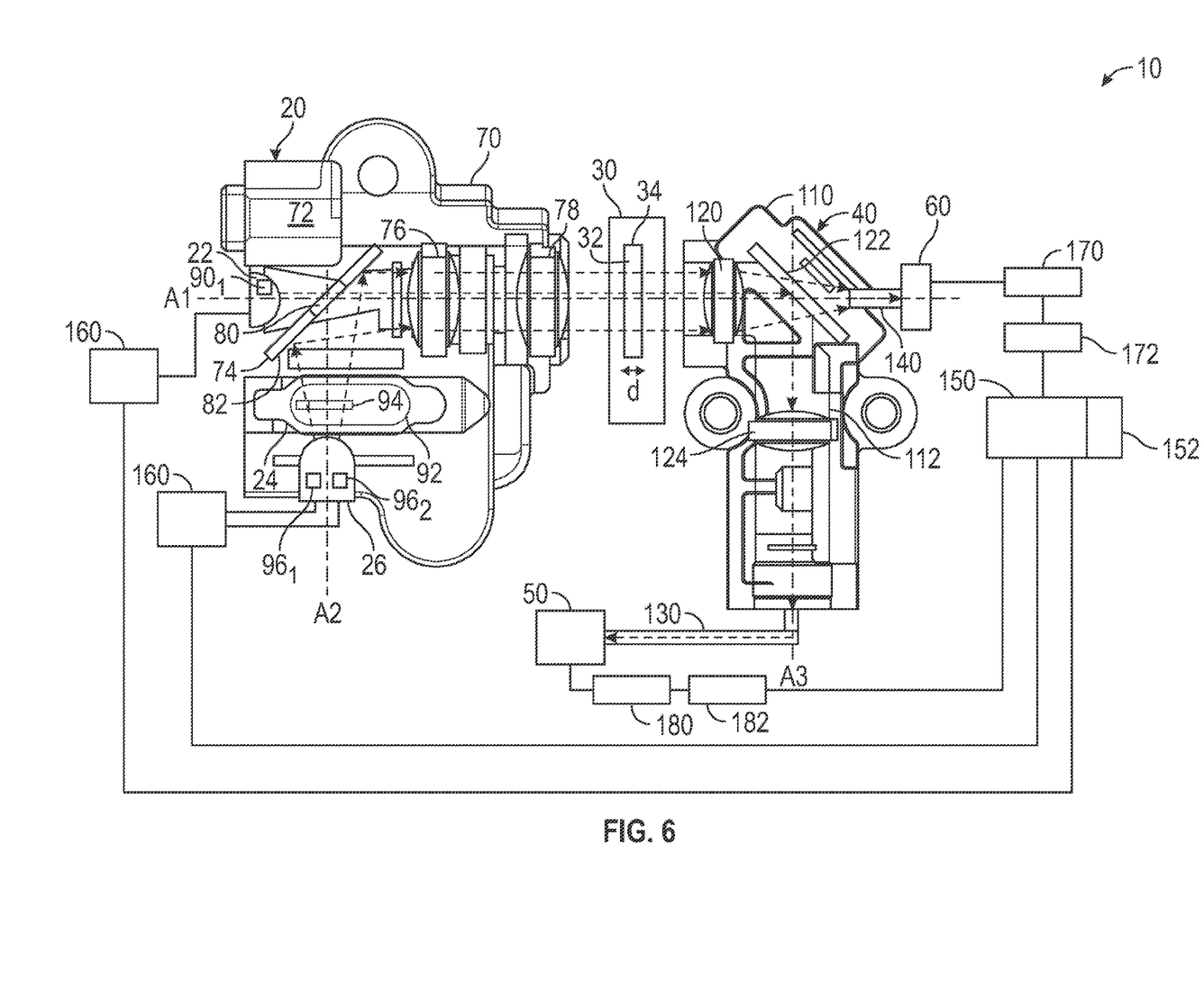
FIG. 6 is a diagram of the exemplary spectroscopy analyzer of FIG. 1 in use, in accordance with the present disclosure.

Turning to FIG. 6, exemplary methods of use of the spectroscopy analyzer 10 will now be described. However, it will be understood that the spectroscopy analyzer 10 may be used in other ways and with other configurations.

In general, the spectroscopy analyzer 10 may utilize the dichroic mirror-reflector 122 to receive the analysis light and pass the second range of light as detector light through the dichroic mirror-reflector 122 to the detector 60 and reflect the first range and/or the third range of light as spectrometer light to the spectrometer 50. The spectroscopy analyzer 10 may analyze one or more properties of the sample 32 based on the properties of the detector light and the spectrometer light received by the detector 60 and the spectrometer 50, respectively.

Further, in some implementations, the spectroscopy analyzer 10 may emit multiple different wavelength ranges of light (which may include light both inside and outside of a broadband area typically used for oximetry), combine the multiple different wavelength ranges of light, focus the light waves into the specimen light onto the sample 32 which passes through the sample 32 to result in the analysis light, collect and focus the analysis light to the dichroic mirror-reflector 122 which passes the second range of light as detector light through the dichroic mirror-reflector 122 to the detector 60 and reflects the first range and/or the third range of light as spectrometer light to the spectrometer 50, and analyze one or more properties of the sample 32 based on the properties of the detector light and the spectrometer light received by the detector 60 and the spectrometer 50, respectively.

In some implementations, the one or more computer processors 150 may be configured to execute software code that causes the one or more computer processors 150 to control the first light source 22, the third light source 24, and/or the second light source 26 of the illumination unit 20, such as through the one or more drivers 160, to cause the first light source 22, the third light source 24, and/or the second light source 26 to stop or start to emit light. The first light source 22 may emit the first light in the first light range, such as in a visible light range of approximately 450 nm to approximately 680 nm. The second light source 26 may emit the second light in the second light range, which may be non-contiguous ranges, and/or particular wavelengths, such as, for example, wavelengths and/or ranges within the ultraviolet light range and the infrared light range. The third light source 24 may emit the third light in the third light range, or at a third wavelength such as at approximately 585 nm, for example.

The first light may pass through the aperture 80 of the reflector 74 to the focal lens 76. The third light may reflect off the reflective surface 82 of the reflector 74 to the focal lens 76. The second light may reflect off the reflective surface 82 of the reflector 74 to the focal lens 76.

The focal lens 76 may focus the first light, the second light, and/or the third light and pass the first light, the second light, and/or the third light to the exit lens 78. The exit lens 78 may focus the first light, the second light, and/or the third light into the specimen light onto the sample 32 in the microchannel 34 of the sample holder 30. The focused specimen light may have a diameter smaller than the length of the microchannel 34.

The microchannel 34 may contain residual water from a wash of the microchannel 34, known as wash carryover, that may dilute the sample 32. The sample 32 may be a blood sample.

The specimen light may pass through the sample 32 in the microchannel 34 of the sample holder 30, resulting in output of the analysis light to the receiving lens 120 of the optical element device 40.

The receiving lens 120 may focus the analysis light onto the dichroic mirror-reflector 122.

In some implementations, the focal lens 76, the exit lens 78, and/or the receiving lens 120 do not necessarily collimate the light, as it may not be necessary to collimate the light when the path length through the sample 32 is relatively small (for example, 100 microns). Additionally, there is selectivity in the output lens 124 as it focuses the light to the fiber optic cable 130 and/or the spectrometer 50. This lack of collimation is advantageous as collimation does not work with multiple lenses. Additionally, collimation tubes and the corresponding increase in the output of the first and second light sources 22, 26 are not desirable, as increased output would make the first light and the third light drift in amplitude and in wavelength, which is problematic since spectrometer analysis of light signals may be sensitive to 0.01 nm, and the spectrometer 50 may not support shifts in wavelengths from the expected wavelengths beyond a range of expected wavelengths. Additionally, the sample 32 scatters the specimen light, such that the resulting analysis light is not collimated, even if the specimen light was collimated when it went into the sample.

The dichroic mirror-reflector 122 may receive the focused analysis light from the receiving lens 120 and reflect and filter the analysis light such that the spectrometer light (including the first portion of the analysis light in the first light range and/or the third light range) is reflected off the dichroic mirror-reflector 122 to the output lens 124, and the detector light (including the second portion of the analysis light in the second light range(s), originally emitted from the second light source 26) passes through the dichroic mirror-reflector 122 to the detector 60 or to the second fiber optic cable 140 and then to the detector 60.

The output lens 124 may receive and focus the spectrometer light reflected from the dichroic mirror-reflector 122 directly to the spectrometer 50 or to the first fiber optic cable 130 positioned between the output lens 124 and the spectrometer 50. The output lens 124 may focus the spectrometer light into a circular spot having a diameter greater than the diameter of the first fiber optic cable 130.

The spectrometer 50 may receive the spectrometer light from the output lens 124 and, in some implementations, through the first fiber optic cable 130.

The detector 60 may receive the detector light passed through the dichroic mirror-reflector 122 and, in some implementations, through the second fiber optic cable 140. In some implementations, the detector 60 may output one or more signal indicative of detection of the detector light to the one or more computer processors 150. The one or more computer processors 150 may execute software that causes the one or more computer processors 150 to receive and analyze the one or more signal indicative of detection of the detector light from the detector 60 to determine one or more properties of the detector light indicative of one or more properties of the sample 32.

In some implementations, the detector 60 may output the one or more signal indicative of detection of the detector light to the first amplifier 170, which may receive, amplify, and output one or more signal from the detector 60 indicative of the detector light to the one or more first analog-to-digital converter 172. The one or more first analog-to-digital converter 172 may receive the amplified detector light from the first amplifier 170, convert the detector light to a digital signal, and output the digital signal. The one or more computer processors 150 may be configured to execute software that causes the one or more computer processors 150 to receive and analyze the digital signal from the one or more first analog-to-digital converter 172 to determine one or more properties of the detector light indicative of one or more properties of the sample 32.

The one or more properties of the sample 32 determined based on the detector light may include the presence and/or amount of water in the sample 32. The detector 60 may provide a signal indicative of the presence and/or amount of residual water from a wash cycle of the sample holder 30 (known as wash carryover), such as residual water in the microchannel 34. Detection of residual water in the sample 32 is important in that the water may dilute the sample 32 and change spectral properties of the sample 32, which may affect the analysis of the signals from the spectrometer 50.

In some implementations, the spectrometer 50 may output the one or more signal indicative of the spectrometer light to the one or more computer processors 150. The one or more computer processors 150 may execute software that causes the one or more computer processors 150 to receive and analyze the one or more signal indicative of the spectrometer light to determine one or more properties of the spectrometer light indicative of one or more properties of the sample 32.

In some implementations, the spectrometer 50 may output the one or more signal indicative of the spectrometer light to the one or more second amplifier 180, which may receive, amplify, and output one or more signal indicative of the signal from the spectrometer 50 to the one or more second analog-to-digital converter 182. The one or more second analog-to-digital converter 182 may receive the amplified spectrometer light from the second amplifier 180, convert the amplified spectrometer light from the second amplifier 180 to a digital signal, and output the digital signal. The one or more computer processors 150 may execute software code that causes the one or more computer processors 150 to receive and analyze the digital signal from the one or more second analog-to-digital converter 182 to determine one or more properties of the spectrometer light indicative of one or more properties of the sample 32, such as the presence and/or type of one or more analytes in the sample 32 and/or blood gas co-oximetry information.

In some implementations, the one or more computer processors 150 may execute software that causes the one or more computer processors 150 to correct and/or adjust the analysis of the sample 32 from the spectrometer 50, or carry out the analysis of the sample 32 from the spectrometer 50, using information from the analysis of the sample 32 from the detector 60. For example, the analysis of the sample 32 from the spectrometer 50 may be adjusted for the presence of water in the sample, as determined by the analysis of the detector light.

In some implementations, the one or more computer processors 150 may execute software that causes the one or more computer processors 150 to calibrate the spectrometer 50 based on the information from the detector 60.

CONCLUSION

Conventionally, spectrophotometers utilize a single light wavelength range or, if multiple light wavelengths are included, the spectrophotometers are bulky and require multiple spectrometers. In accordance with the present disclosure, spectroscopy analyzers are disclosed that utilize multiple light wavelength ranges but that have a compact, efficient footprint.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A spectroscopy analyzer, comprising:
    a first light source positioned on a first axis and configured to emit a first light in a first light range of approximately 450 nm to approximately 680 nm;
    a second light source positioned on a second axis that intersects and is angularly offset with respect to the first axis and configured to emit a second light in a second light range different than the first light range;
    a third light source positioned on the second axis and configured to emit a third light in a third light range different than the second light range; and
    an optical element device positioned to receive at least a portion of an analysis light that passes through a sample of a fluid specimen, the analysis light including the first light, the second light, and the third light, the optical element device comprising:
    a device housing assembly that defines a device internal space; and
    a dichroic mirror-reflector within the device internal space of the device housing assembly positioned to receive the analysis light, the dichroic mirror-reflector configured to filter the analysis light such that a first portion of the analysis light in the first light range is reflected off the dichroic mirror-reflector as a spectrometer light, and such that a second portion of the analysis light in the second light range passes through the dichroic mirror-reflector as a detector light
    an illumination unit, comprising:
        a unit housing assembly that defines a unit internal space, wherein one or more of the first light source, the second light source, and the third light source are positioned within the unit internal space of the unit housing assembly;
        a reflector within the unit internal space of the unit housing assembly, the reflector including an aperture through which the first axis extends such that the first light passes through the aperture and a reflective surface angled in relation to the first axis and second axis such that the second light reflects off the reflector;
        a focal lens within the unit internal space of the unit housing assembly positioned to receive and focus the first light passed through the aperture of the reflector, and to receive and focus the second light reflected from the reflective surface of the reflector; and
        an exit lens within the unit internal space of the unit housing assembly positioned to receive and focus the first light and the second light from the focal lens into a specimen light directed onto the sample to produce the analysis light.

2. The spectroscopy analyzer of claim 1, further comprising:
    a sample holder having a microchannel configured to hold the sample of the fluid specimen and positioned such that the specimen light focused from the exit lens illuminates the sample, wherein the specimen light moving through the sample produces the analysis light.

3. A spectroscopy analyzer, comprising:
an illumination unit, comprising:
a unit housing assembly that defines a unit internal space;
a first light source within the unit internal space of the unit housing assembly, the first light source positioned on a first axis and configured to emit first light in a first light range of approximately 450 nm to approximately 680 nm;
a second light source within the unit internal space of the unit housing assembly, positioned on a second axis that intersects and is angularly offset with respect to the first axis and configured to emit second light in at least a second light range of approximately 1050 nm to approximately 2500 nm;
a third light source within the unit internal space of the unit housing assembly, the third light source positioned on the second axis, the third light source configured to emit third light in a third light range different than the second light range;
a reflector within the unit internal space of the unit housing assembly, the reflector including an aperture through which the first axis extends such that the first light passes through the aperture and a reflective surface angled in relation to the first axis and second axis such that the second light and the third light reflect off the reflector;
a focal lens within the unit internal space of the unit housing assembly positioned to receive and focus the first light passed through the aperture of the reflector, and to receive and focus the second light and the third light reflected from the reflective surface of the reflector; and
an exit lens within the unit internal space of the unit housing assembly positioned to receive and focus the first light, the second light, and the third light from the focal lens into a specimen light;
a sample holder having a microchannel configured to hold a sample of a fluid specimen and positioned such that the specimen light focused from the exit lens illuminates the sample, wherein the specimen light moving through the sample produces an analysis light;
an optical element device positioned to receive at least a portion of the analysis light that passes through the sample, the optical element device comprising:
a device housing assembly that defines a device internal space;
a receiving lens within the device internal space of the device housing assembly positioned to receive and focus the analysis light;
a dichroic mirror-reflector within the device internal space of the device housing assembly positioned to receive the focused analysis light from the receiving lens, the dichroic mirror-reflector configured to filter the analysis light such that a first portion of the analysis light in the first light range and the third light range is reflected off the dichroic mirror-reflector as a spectrometer light, and such that a second portion of the analysis light in the second light range passes through the dichroic mirror-reflector as a detector light; and
an output lens within the device internal space of the device housing assembly positioned to receive and focus the spectrometer light;

a spectrometer positioned to receive the focused spectrometer light from the output lens; and
a detector positioned to receive the detector light through the dichroic mirror-reflector.

4. The spectroscopy analyzer of claim 3, further comprising:
one or more amplifier connected to the detector and configured to receive, amplify, and output one or more signal from the detector indicative of the detector light;
one or more analog-to-digital converter configured to receive the amplified signal from the amplifier, convert the amplified signal to a digital signal, and output the digital signal; and
one or more computer processor configured to execute software code that causes the one or more computer processor to receive and analyze the digital signal from the one or more analog-to-digital converter to determine one or more properties of the detector light indicative of one or more properties of the sample.

5. The spectroscopy analyzer of claim 4, wherein the one or more properties of the sample includes a presence of water in the sample.

6. The spectroscopy analyzer of claim 3, further comprising:
one or more amplifier connected to the spectrometer and configured to receive, amplify, and output one or more signal from the spectrometer indicative of the spectrometer light;
one or more analog-to-digital converter configured to receive the amplified signal from the amplifier, convert the amplified signal from the amplifier to a digital signal, and output the digital signal; and
one or more computer processor configured to execute software code that causes the one or more computer processor to receive and analyze the digital signal from the one or more analog-to-digital converter to determine one or more properties of the spectrometer light indicative of one or more properties of the sample.

7. The spectroscopy analyzer of claim 6, wherein the one or more properties of the sample includes a presence and type of one or more analytes in the sample.

8. The spectroscopy analyzer of claim 3, further comprising:
one or more computer processors configured to execute software code that causes the one or more computer processor to:
receive and analyze one or more signal from the detector to determine one or more first properties of the sample; and
receive and analyze one or more signal from the spectrometer to determine one or more second properties of the sample.

9. The spectroscopy analyzer of claim 8, wherein the one or more first properties of the sample include a presence and/or amount of water in the sample and the one or more second properties of the sample include a presence and/or amount of one or more analytes in the sample.

10. The spectroscopy analyzer of claim 8, wherein determining the one or more second properties is based at least in part on the determined one or more first properties.

11. The spectroscopy analyzer of claim 3, wherein the specimen light is focused into a generally circular shape having a diameter onto the sample.

* * * * *